(12) United States Patent
Heines et al.

(10) Patent No.: US 11,188,061 B2
(45) Date of Patent: Nov. 30, 2021

(54) CONFIGURATION OF AN AUTOMATION SYSTEM

(71) Applicant: Phoenix Contact GmbH & Co. KG, Blomberg (DE)

(72) Inventors: Benno Heines, Detmold (DE); Jörg Jeschin, Einbeck (DE); Matthias Ilse, Kalletal (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 7 days.

(21) Appl. No.: 16/244,942

(22) Filed: Jan. 10, 2019

(65) Prior Publication Data

US 2020/0225646 A1   Jul. 16, 2020

(51) Int. Cl.
*G05B 19/418* (2006.01)
*G05B 19/05* (2006.01)

(52) U.S. Cl.
CPC ..... *G05B 19/41845* (2013.01); *G05B 19/056* (2013.01); *G05B 19/41835* (2013.01); *G05B 19/41865* (2013.01)

(58) Field of Classification Search
CPC ............ G05B 19/41845; G05B 19/056; G05B 19/41835; G05B 19/41865
See application file for complete search history.

(56) References Cited

U.S. PATENT DOCUMENTS

| 2013/0265908 | A1* | 10/2013 | Lessmann | ........... H04L 41/0806 370/254 |
| 2015/0338836 | A1* | 11/2015 | Law | ..................... G05B 19/056 700/87 |
| 2018/0046163 | A1* | 2/2018 | Heines | ............... G05B 19/0426 |

FOREIGN PATENT DOCUMENTS

| DE | 102010048588 A1 | 4/2012 |
| DE | 112012006925 T5 | 6/2015 |
| DE | 112014001381 T5 | 3/2016 |

OTHER PUBLICATIONS

Gerhard Bran, Office Action issued in German patent application No. 102016121788.3, dated Mar. 30, 2017, 24 pp.

* cited by examiner

*Primary Examiner* — Ryan A Jarrett
(74) *Attorney, Agent, or Firm* — Kaplan Breyer Schwarz, LLP

(57) ABSTRACT

A method for configuring an automation system for controlling a process, an automation module, and a computer program product. In the method, a mapping of a physical automation device on a non-instantiated automation module is provided, whereby the non-instantiated automation module specifies a device type and has at least one artifact. Furthermore, the method includes the provision of a non-instantiated automation module in a library and a retrieval of the non-instantiated automation module from the library. Furthermore, the method provides for an instantiation of the automation module and a localization of the instantiated automation modules.

10 Claims, 5 Drawing Sheets

CONFIGURATION OF AN AUTOMATION SYSTEM

FIELD

The present invention relates to the area of automation technology and relates to a method for the configuration of an automation system for controlling a process. Furthermore, the present invention relates to an automation module and a computer program product.

BACKGROUND

Currently, automation programs used to draft an automation system are generally generated with the programming languages defined in the standard IEC 61131, which was valid at the time of the application. Engineering tools, for example PC WORX, are used to create user programs. In addition to the creation of the user programs, these engineering tools offer the option to generate a configuration of connected IO networks such as PROFINET-IO or INTERBUS. This option includes a selection of the IO devices, a setting of their parameters, and a linking of IO data points with corresponding IO variables according to the IEC programming above (IO=Input/Output).

An automation project consists of several parts, such as IEC programming, IO configuration, HMI symbols (HMI=Human Machine Interface) or visualization pages, etc. Each of these parts is understood in this context as a "discipline." Accordingly, a discipline is a subsection. A discipline may also be referred to as a "work." The terms "discipline" and "work" are to be understood as having the same meaning here.

Furthermore, the term "artifact" refers to an element of a discipline, in particular a functional block in an automation module.

Overall, an automation module has a plurality of artifacts from various disciplines.

Furthermore, disciplines may be present as well such as a visualization, security-oriented programming or a network configuration. These disciplines may be formed in the same or in separate engineering programs.

When user programs are created, libraries are often used which integrate parts of the programming in functional blocks or programs. These libraries may be created by the manufacturer, user, or third parties.

In particular in production automation, libraries are of particular significance because automation systems, hereinafter also referred to as systems, are increasingly composed of predefined modules which are arranged in each new system again in a new configuration.

In addition to the programs according to the IEC standard above, configurations for IO networks, visualization pages, etc., as well as their interconnection must be created as well. Said individual disciplines are supported by corresponding library functions.

One disadvantage here is that disciplines are independent from each other.

It is a task of the present invention to provide a solution to connect disciplines in a better way.

SUMMARY

According to the invention, this task is solved by the features of claim 1. Furthermore, the task is solved by an automation module according to claim 10 and a computer program product according to claim 15. Other embodiments are described in the subclaims.

The task of the invention is solved with a method for the configuration of an automation system for controlling a process. The method provides for a mapping of a physical automation device on a non-instantiated automation module, whereby the non-instantiated automation module specifies a type of device and comprises at least one artifact, in particular at least two artifacts as well as connections between these artifacts. Furthermore, the method comprises the provision of a non-instantiated automation module in a library and a retrieval of the non-instantiated automation module from the library. Furthermore, the method provides for an instantiation of the automation module and a localization of the instantiated automation module.

The invention proposes a solution with which a shared type object in the manner of a container can be created across different disciplines (IEC programming, visualization, network configuration, secure programming, motion control, etc.). This container is hereinafter referred to as the automation module (AM).

The term "automation module" therefore refers to the assignment of an artifact or an accumulation of artifacts from different engineering disciplines, whereby the different engineering disciplines describe different artifacts and/or characteristics of a device type such as a mechatronic device. Consequently, an automation module describes a certain device type, for example a mechatronic device, in particular regarding its function, physical interfaces, and their internal interconnection. Here, such an automation module is used like a container in a library.

The automation module may, for example, have the following artifacts, whereby artifact refers to an element of a discipline:

IEC 61131 programs, functional blocks, functions;
IEC 61508 compliant program parts;
Visualization pages as well as symbols;
IO modules including their configuration data;
Configuration of drives and cam plates, etc.

In addition to the individual artifacts, the connections between data points of the individual artifacts may be established as another artifact in the automation module. An automation module may comprise artifacts for all or just a part of the disciplines.

In particular when it comes to physical connections or hardware connections, or other internal interconnections, it may comprise just requirements for the IO signals to be connected instead of the specification of a concrete hardware specification.

One example for this is a concrete specification of an PLC expansion module in which a fixed allocation from the terminal to the variable or visualization object is already provided. Alternatively, the automation module may only include the request as well that, for example, three analogue output signals with 20 mA are to be connected.

In the "creation of an automation module," a physical automation system which already exists or is in the planning stages is mapped to an automation module. Here, the automation module is not yet instantiated and may be used for a number of automation tasks of a device type. When it is created, a number of artifacts from various disciplines are assigned to a single automation module. Within the automation module, the connections that exist between the individual artifacts may furthermore be created and filed, preferably automatically, in the automation module as well. An engineering system used for this purpose, for example automation software, in particular PC WORX, then automatically and repeatedly detects the connections of a respective automation module and is placed between the works. The automation module may be configured internal or hierarchical in this regard.

After the development of an automation module, the automation module may be filed in a library. During the instantiation of the automation module, these are instantiated from the library in the project. No distinction is therefore made between non-instantiated automation modules, which are generally deployable and stored in a library, from instantiated automation modules, which are individually configured for a physical automation system.

Consequently, "instantiation of automation module" refers to one or more automation modules being retrieved from the library so as to be included in a project.

Here, the "library" is a data library which contains the content of the various artifacts of an automation module such as the program code, HMI symbols, connections, etc.

The individual automation modules therefore constitute respective device types which can be integrated in a process by instantiation.

An automation module itself is filed as a type or device type in the library. In a programming language, such a type is also referred to as a class. An "automation module instance" is a reference to the type filed in the library.

If an automation module is instantiated, instances of these device types are developed in a preferred embodiment, i.e., device 1 to n of this device type, including the respectively comprised artifacts of the individual disciplines. The respectively comprised artifacts are here preferably connected automatically so that the individual artifacts remain permanently assigned to the instances of a respective automation module. Here, the interconnections cause for example an IO signal to be firmly connected with a variable.

The instantiated parts, i.e., the respective instances of a respective automation module, including the artifacts comprised, may then be arranged to form an entire project or process or be integrated in it. If necessary, further programs, visualization pages, etc., may be developed.

The "localization of an automation module" refers to the arrangement or integration in a project or a process so that the individual artifacts are assigned in the project structure depending on the discipline.

In one embodiment, a visualization of the instantiated automation module may be provided in the process. This facilitates the clear arrangement and operability of an engineering tool.

In a further embodiment of the method, an individualization of one or more artifacts may be provided during the instantiation of the automation module. To this purpose, the artifacts are used for instances so as to perform a configuration.

In a further preferred embodiment of the method, the development of connections between artifacts may be provided which are then automatically filed in the not yet instantiated automation module as well. This way, artifacts can be systematized and allocated. It also makes it possible to exchange data and information between individual artifacts.

In a preferred embodiment of the method, an automated detection of these connections between artifacts may be provided. This constitutes another automation option within the automation module.

Furthermore, a selection of a variation of an IO system with the localization of the instantiated automation module may be provided in a preferred embodiment. This way, interfaces may be specified.

In another embodiment of the method, a performance of a modification on a non-instantiated automation module may preferably be provided, whereby the modification affects all instantiated automation modules.

This increases the efficiency of the programming because a plurality of already instantiated automation modules can be performed with a modification. It therefore ensures a better handling in the case of modifications of an automation system and makes the operation more clearly laid out.

Individual artifacts within a respective instance can only be deleted or modified by a deletion or modification within the corresponding automation module and impacts all already instantiated automation modules.

Alternatively, the entire instance of an automation module may be deleted or assigned to another automation module.

Furthermore, an automatic interconnection of automation modules may be provided in a preferred embodiment with specified rules.

These rules may have been filed in a database, which can be accessed as needed. In this way, interconnections may be performed quickly and be resistant against faults.

In a further embodiment of the method, an interconnection of instantiated automation modules may be provided with the use of a data list. This improves the structure of the individual programming and interface management.

Furthermore, the task of the invention is solved with an automation module. Here, the automation module comprises a specification of a device type, whereby the automation module comprises at least one artifact and whereby the artifact has characteristics of the device type with a parametrization option.

The automation module may be present as a non-instantiated or as an instantiated automation module. A non-instantiated automation module is generally stored in a library for multiple uses of the automation module, in particular as a template for an individual configuration of an automation module, which turns into an instantiated automation module due to the configuration. Preferably, the non-instantiated automation module is preserved in the library and the instantiated automation module is a modified copy of the non-instantiated automation module stored in the library.

In an automation module, in particular in an instantiated automation module, different parameters may be modifiable, such as the speed of a conveyor belt, response times of a robot, color display in an alarm, etc.

In a preferred embodiment, it may be provided that the automation module has an internal hierarchical structure.

This is possible both in a non-instantiated and an instantiated automation module. Here, artifacts may have a hierarchy in relation to each other. Furthermore, the device type may have the highest hierarchy, and the artifacts in an automation module are assigned to it.

Furthermore, it may preferably be provided that the automation module comprises several artifacts from a same discipline.

This means that individual automation tasks within a non-instantiated and an instantiated automation module can be clearly separated.

It may furthermore be considered advantageous in an embodiment that the automation module is reusable in different projects.

This has the advantage that an automation module, preferably a non-instantiated automation module, is stored in another library.

The automation module may be used several times for different projects and/or processes, i.e., for different automation tasks, without having to be modified. By using one and/or even several different automation modules multiple times, an orchestration for the mapping of a complete project and/or process to be controlled instead of a programming is possible as well.

In a further embodiment, it may be provided that the automation module comprises program code, whereby the program code uses different programming languages.

Here, the automation module may, for example, use a first and a second programming language, whereby the two programming languages differ from each other. It is furthermore possible as well that an artifact uses programming code with different programming languages. Consequently, the automation module may comprise variable elements from the program code of different programming languages. Graphic programming languages may be incorporated here as well.

Furthermore, the task of the invention is solved by a computer program product with program code means for the performance of the method according to the invention, whereby the computer program product runs on a computer system of an automation system.

Here, the program code means and/or the program code may be performed on a processor or alternatively on a number of processors.

Further embodiments relating to the method according to the invention and an automation module according to the invention are possible.

In one embodiment, an automation module may comprise alternative artifacts, for example one artifact for an IO system with Axioline and one for INTERBUS. During the instantiation of the automation module, users may select the desired variation of a bus system and localize it accordingly as well.

Furthermore, an automation module may comprise several implementations, for example a small overview symbol for diagnostic purposes and a more complex symbol for operational purposes.

Furthermore, the task of the invention is solved with a computer program product with program code means for the performance of the method according to the invention, whereby the computer program product runs on a computer system of an automation system.

This has the following advantages:

Options are proposed for the creation of automation modules that consist of defined parts, for example in the form of software parts. This results in numerous advantages for a software programmer. Since these modules are fast and easy to reuse, development times for the drafting of an automation system for controlling a process can be accelerated. This may save engineering costs and reduce error sources since certifications, tests, and programming must only be performed once.

In particular in complex systems or automation systems, the use of automation modules increases the quality and efficiency of the configuration and/or programming.

A reusability of automation modules may minimize the work effort and accelerate the development process.

It is also possible that program codes can be processed both in IEC 61131-3 and in C/C++ or C #. Consequently, the automation modules may comprise a mixed program code.

BRIEF DESCRIPTION OF THE DRAWINGS

Some exemplary embodiments of the invention are schematically depicted in the drawings and are described in further detail below.

DETAILED DESCRIPTION

An automation system contains many different components which are operated as physical functional units or system modules. In an automation system, for example a system in the automotive industry, there are many different ready-made system modules. These include for example conveyor belts, lifting tables, robot cells, turntables, and other installations.

Figure 1:
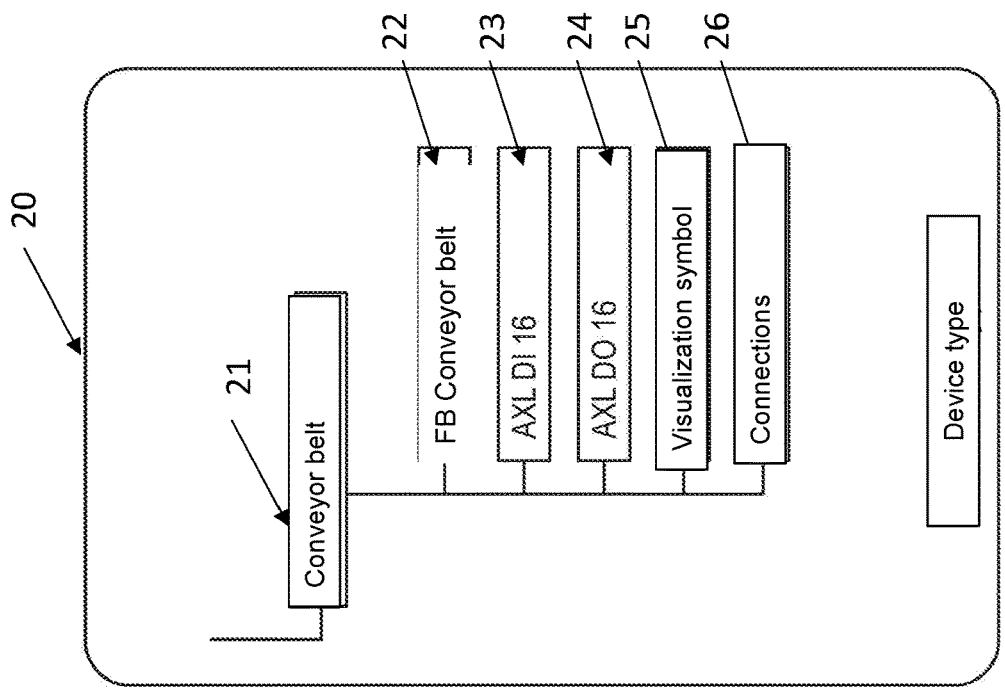
FIG. 1 shows an exemplary embodiment for the development of an automation module for a conveyor belt.
Figure 1:
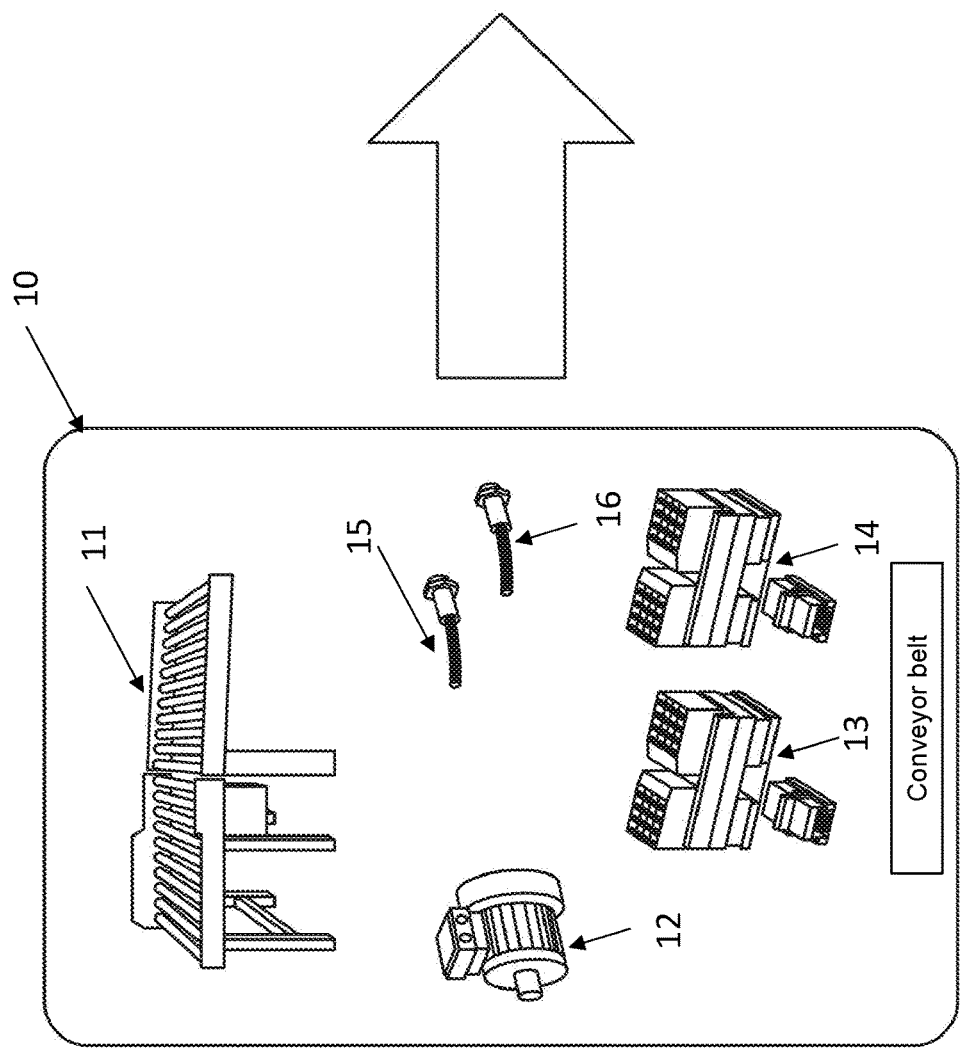

FIG. 1 shows an exemplary embodiment of an automation device 10 as a system module. The automation device 10 is a mechatronic device in the form of a conveyor belt. The conveyor belt 10 comprises a belt 11, a servomotor 12, two IO modules 13, 14, and two sensors 15, 16.

Furthermore, FIG. 1 shows an embodiment for the development of an automation module 20 for a conveyor belt 10. The physical conveyor belt 10 is illustrated on the basis of the automation module 20 for a process control. To this purpose, a device type 21 is specified, here "conveyor belt." The artifacts 22, 23, 24, 25, 26 are assigned to the device type 21. The automation module of FIG. 1 is a non-instantiated automation module which initially only specifies the device type 21 without representing a specific, physical automation device. The artifact 22 integrated in the automation module 20 describes, for example, the specific device type 21, here "conveyor belt," and therefore, for example, its function, artifacts 23 and 24 describe, for example, specific values for physical interfaces and/or signal requirements, which may be used alternatively, and artifact 26 describes, for example, the internal interconnection. Artifact 25 describes the device type 21 in further detail, for example graphically by means of a visualization page or a symbol.

The automation module 20 is used for the individual composition of ready-made elements such as artifacts so as to fulfill an automation task, in this embodiment the operation and/or controlling of a conveyor belt.

Individual system modules are developed independently from each other and then combined and mapped in a joint automation module. Using the example of the type of a conveyor belt, the non-instantiated automation module 20 comprises a plurality of systems such as servomotors, end position sensors, IO modules, etc. Logic in the form of IEC program code is used for the automation task as well, whereby the logic is able to control the servomotors on the basis of sensors and handover signals.

Figure 2A:
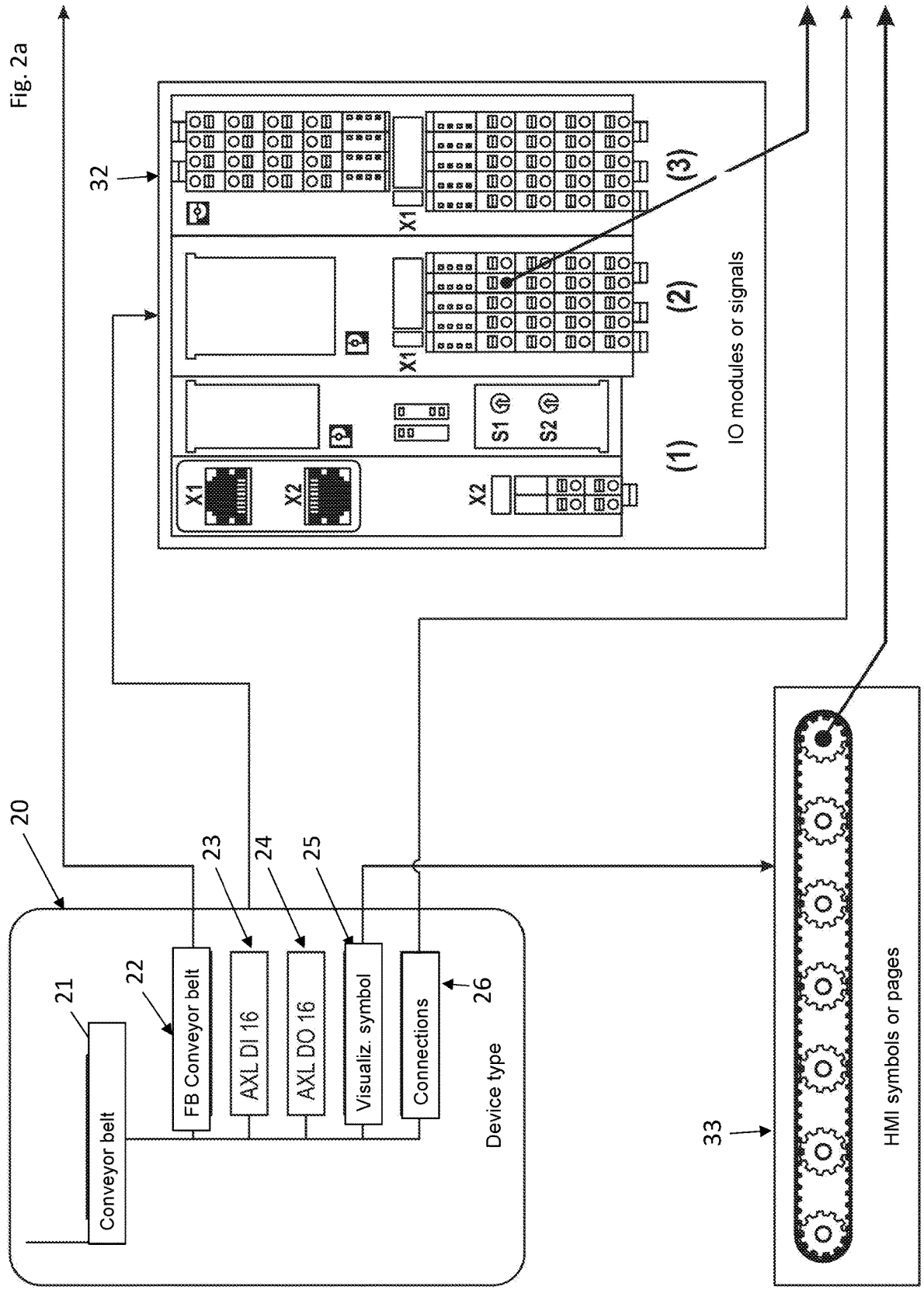
FIGS. 2a-2c collectively show an exemplary embodiment of an automation module with a plurality of artifacts.
Figure 2B:
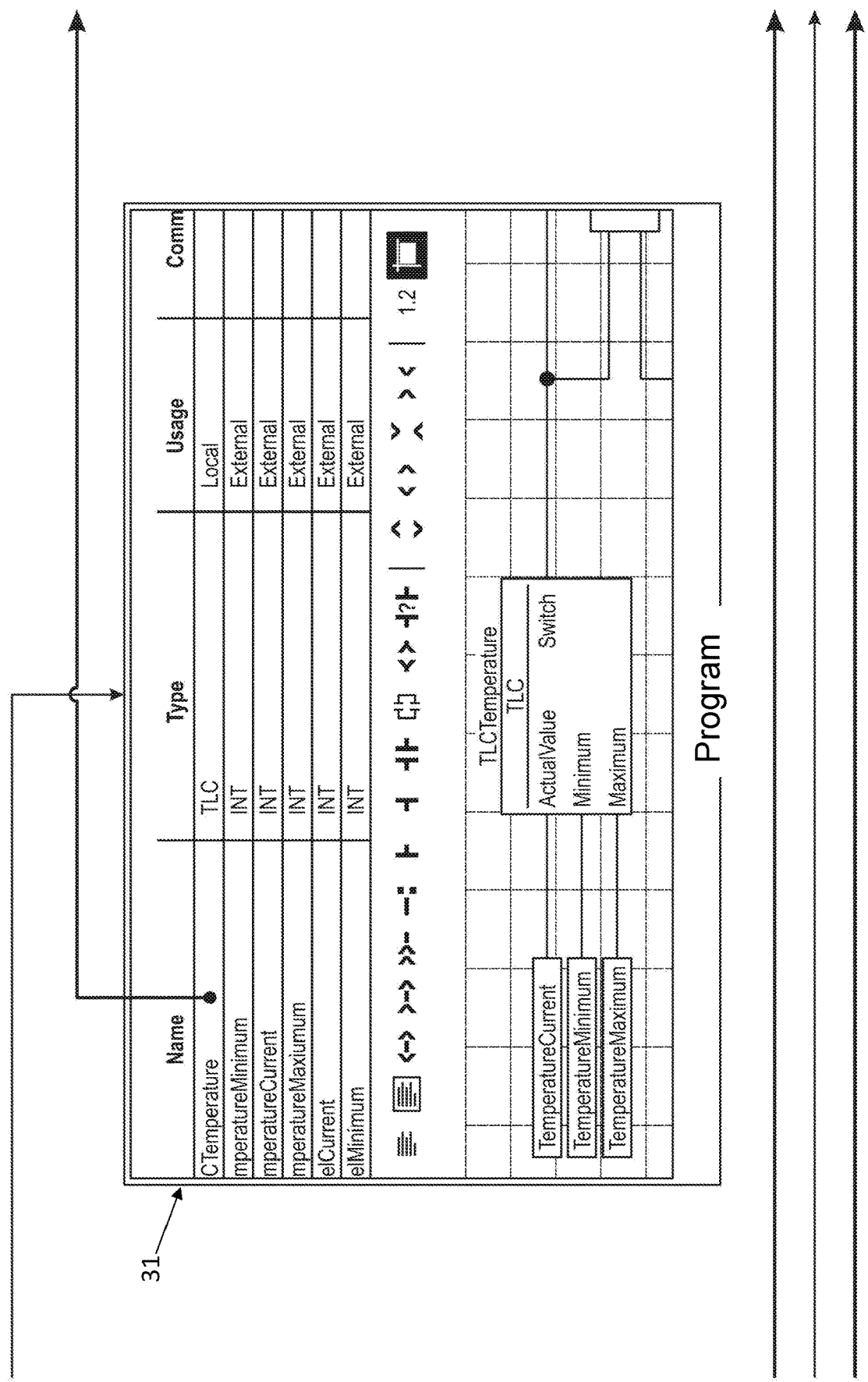
Figure 2C:
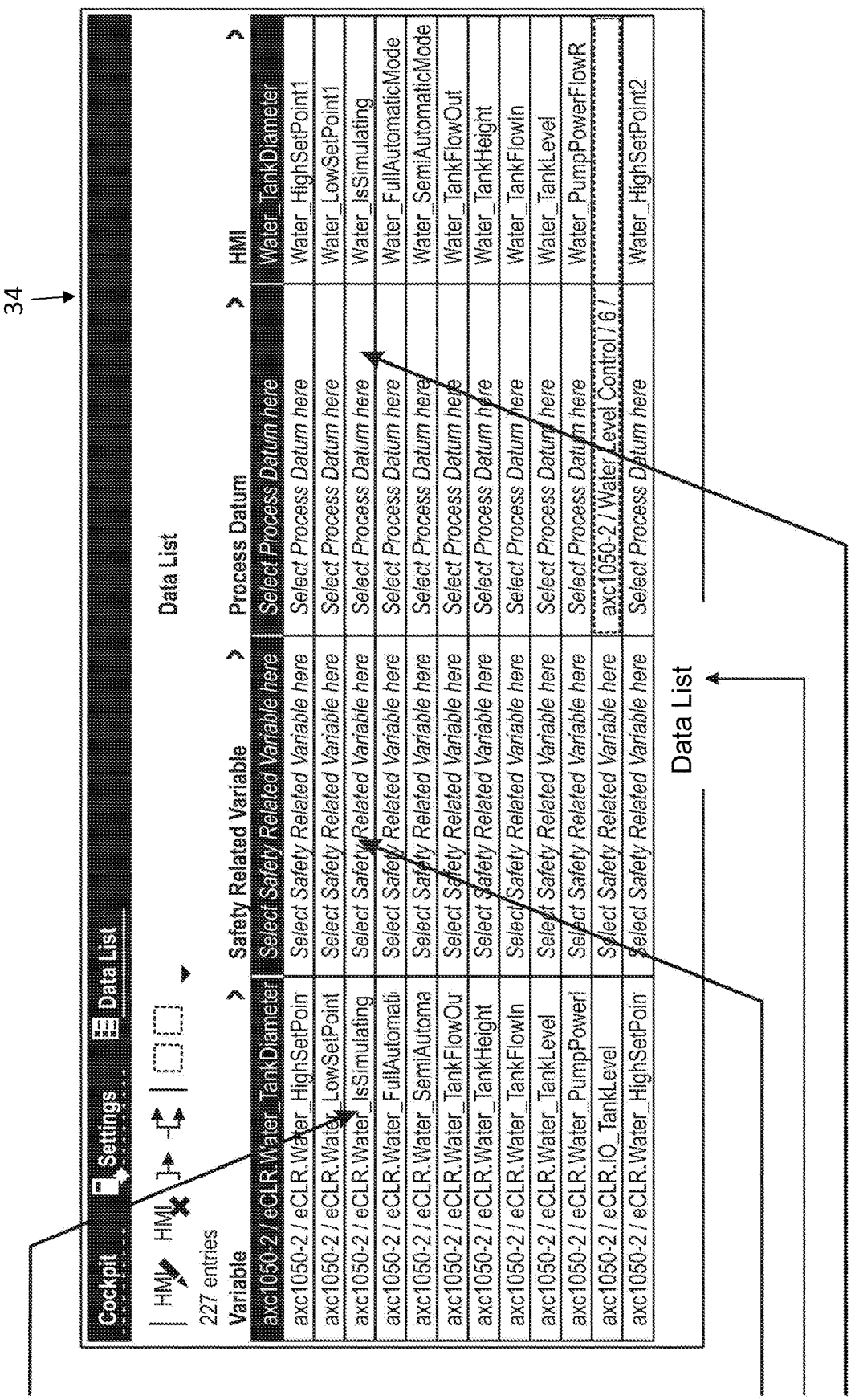
Figure 3:
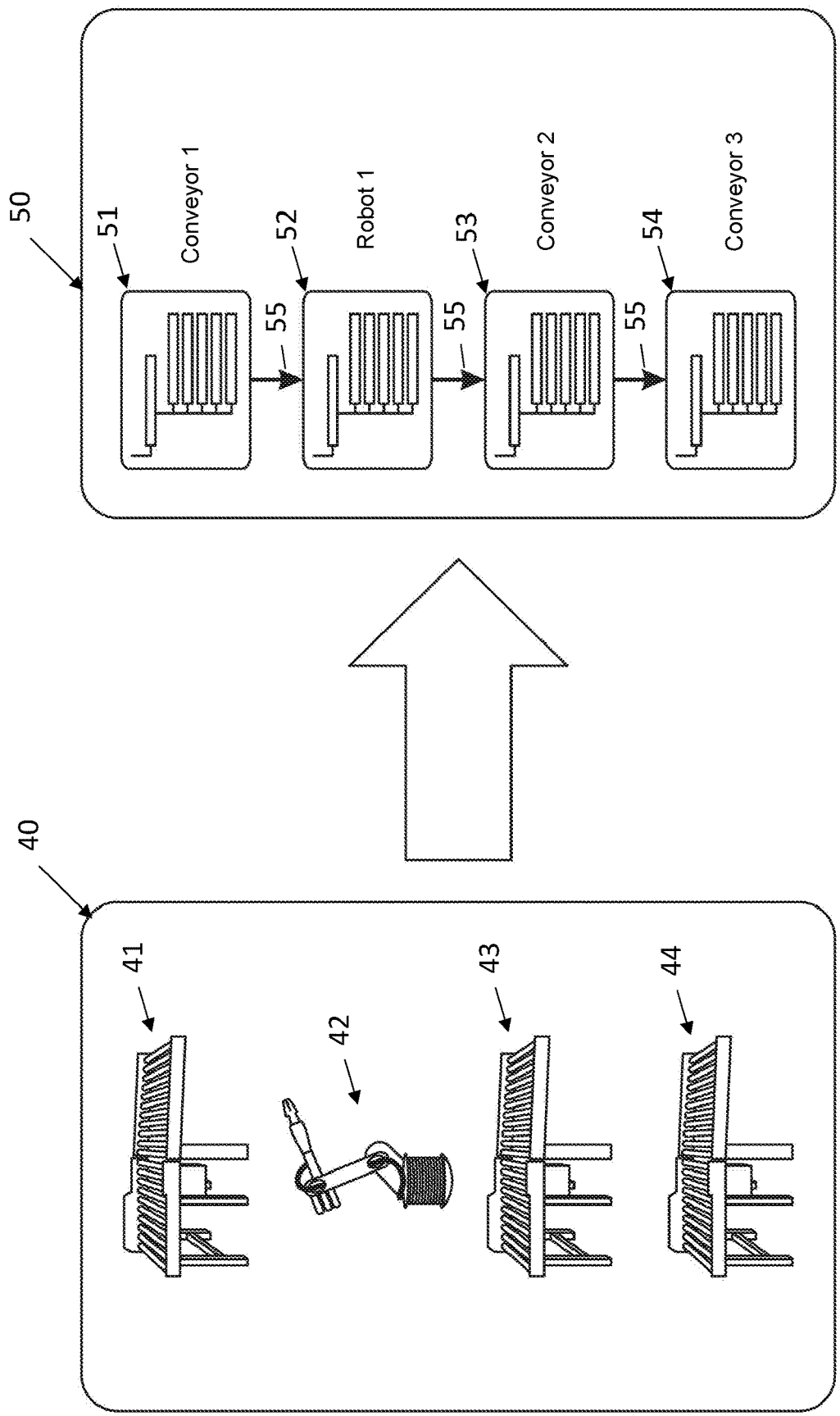
FIG. 3 shows an exemplary embodiment for an orchestration of automation modules for controlling a system.

FIGS. 2a-2b collectively show the embodiment of the automation module 20 of FIG. 1 with a plurality of artifacts 22-26 and their details. In FIGS. 2a-2c, the non-instantiated automation module of FIG. 1 is prepared for instantiation through the configuration of interfaces and the generation of data lists. After the configuration, i.e., an instantiation, of the non-instantiated automation module, it becomes an instantiated automation module as shown in FIG. 3.

The artifact 22 in FIG. 2a is a program 31 shown in FIG. 2b, which makes a programming of the system module "conveyor belt" possible. The programming may be performed here either graphically or with programming code. It is also possible to use different programming languages in the program 31.

The artifact 23 in FIG. 2a describes and visualizes IO modules or signals that are needed for the automation task of the conveyor belt 10. With artifact 23, for example, input and output channels and assignments of the individual electrical connections are visualized. To this purpose, artifact 23 has three assignment fields (1), (2), (3) in the present embodiment. For each assignment field, interconnections are specified for the inputs and outputs of signals and energy supplies.

Artifact 24 in FIG. 2a is formed similarly to artifact 23 in that it is used for visualization purposes as well. It may be an alternative to artifact 23, for example.

Furthermore, artifact 25 in FIG. 2a has the function of a visualization. HMI symbols or visualization pages may be represented with this artifact 25. In the present exemplary embodiment, the physical conveyor belt 10 is illustrated with a conveyor and individual driver rollers.

Artifact 26 in FIG. 2c is a data list 34 which allows for a data connection of the other artifacts 22, 23, 25 or 31, 32, 33, respectively. In the data list 34, connections such as data and energy connections of inputs and outputs of the system module 20 may be specified. Furthermore, interfaces and their interconnections may be specified with the data list 34.

Consequently, at least one artifact for a graphic symbol, here artifact 25, may be integrated in the automation module for a visualization, whereby the symbol may represent the type "conveyor belt" with its dynamic characteristics as well. The variables from the programming 31 may be connected with IO points or HMI symbols (HMI=Human Machine Interface), i.e., user interfaces. All information including the desired connections are stored in the automation module 20 of the type "conveyor belt."

The automation module 20 is part of a data library which a user may use to configure the automation system 40.

FIG. 3 shows an exemplary embodiment of an automation system 40 with a plurality of components in the form of automation devices 41, 42, 43, 44. Here, the automation devices 41, 43, 44 are conveyors and the automation system 42 a robot. The automation devices 41-44 shown in FIG. 3 form in this case the automation system 40, which may be part of an overall system. The physical automation devices 41-44 are transformed to a process image 50 in FIG. 3.

FIG. 3 furthermore shows an interconnection of automation modules 51-54 instantiated via interconnections 55 and/or an orchestration for controlling the automation system 40. The instantiated automation modules 51, 53, 54 relating to a conveyor device can result from the non-instantiated automation module 20 of FIG. 1, whereby they are a modified copy of the non-instantiated automation module 20 and the non-instantiated automation module 20 remains in the library for further templates.

For the development of individual and/or instantiated automation modules 51-54, already existing non-instantiated automation modules 10 can draw on the library to individually configure the physical units 41-44. It is possible, for example, that the conveyors 41, 43, 44 must be allocated to the device type "conveyor belt" but differ from these in their configuration. The length of the first conveyor 41 may differ from the length of another conveyor, compared to the two other conveyors 43, 44. The conveying length influences, however, the point in time that the robot 42 installed thereafter is deployed. The conveyors 41, 43, 44 may differ from each other in other characteristics as well.

Therefore, ready-made automation modules are individually configured and/or adapted and arranged for different tasks and model series.

The already filed automation module 20 is used for the individual adaptation of the automation module for the conveyors 51, 53, 54 and adapted according to the necessary parameters. This way, it is possible to use a basic component from the library for each device type to then individually parametrize the same thereafter. Then the individual instantiated automation modules 51-54 can be connected via interconnections 55 in that these interconnections are set up in an engineering tool and represented, preferably in a visualized manner as well.

FIG. 3 shows an exemplary embodiment for an orchestration of system parts 41-44 from instantiated automation modules 51-54, as they were developed for example on the basis of the exemplary embodiment of FIG. 1. When developing an engineering system, the automation modules are instantiated and localized in an engineering tool according to the real configuration of the system 40. In the present exemplary embodiment, this means that the instances "conveyor 1," "conveyor 2," and "conveyor 3" are generated by the type or device type "conveyor belt." Furthermore, the instance "robot 1" is developed from an automation module of the device type "robot" which is found in the data library of the engineering tool as well. A localization occurs by specifying in which order the individual system modules 41-44 are installed or how instantiated automation modules 51-54 are to be interconnected to map the real system as a process.

Accordingly, a process image 50 is generated from the physical units 41-44 of the automation system 40. This is done by sequentially connecting the individual automation devices 41-44 in their physical connection in series as instantiated automation modules 51-54.

A connection between the system parts can be performed by interconnecting the individual instances and the artifacts contained therein, for example by placement (visual localization) of the visualization symbols on a visualization page, localization of the IO modules and/or other artifacts contained. All connections within the automation module are automatically provided by the automation module type used.

Overall, a solution is proposed that makes it possible to integrate and describe system parts in all disciplines so that the system parts can be generated through simple instantiation when used repeatedly. The system part is considered as a whole. This means that the individual disciplines are not considered separately from each other but are taken into account as a whole.

A development of the automation solution is not facilitated here any longer by simple programming, but by an arrangement of system parts. These system parts are arranged by the user according to the real overall system.

LIST OF REFERENCE NUMERALS

10 Automation device
11 Conveyor belt
12 Servomotor
13 IO module
14 IO module
15 Sensor
16 Sensor
20 Automation module
21 Device type
22-26 Artifacts
31 Program
32 IO-Module or signals
33 HMI symbols or pages
34 Data list 40 Automation devices of an automation system
41 First conveyor
42 Robot
43 Second conveyor
44 Third conveyor
50 Process image
51-54 Instantiated automation module
55 Interconnection of instantiated automation modules

The invention claimed is:

1. A method for the configuration of an automation system for controlling a process, comprising:
   mapping a physical automation device on a non-instantiated automation module, whereby the non-instantiated automation module specifies a device type and comprises at least two artifacts as well as connections between these artifacts;
   providing the non-instantiated automation module in a library for multiple uses of the automation module as a template for individually automation module configuring;
   retrieving the non-instantiated automation module from the library;
   instantiating the non-instantiated automation module by individually automation module configuring, thereby turning the non-instantiated automation module into an instantiated automation module; and
   localizing the instantiated automation module by specifying how instantiated automation modules are to be interconnected to map the real automation system as a process, by sequentially connecting individual automation devices in their physical connection as instantiated automation modules in series.

2. The method according to claim 1, further comprising visualizing the instantiated automation module.

3. The method according to claim 1, further comprising individualizing one or more artifacts that may be provided during the instantiation of the automation module.

4. The method according to claim 1, further comprising developing connections between artifacts and automatically filing the connections between the artifacts in the non-instantiated automation module.

5. The method according to claim 1, further comprising automatically detecting connections between artifacts.

6. The method according to claim 1, further comprising selecting a variation of an TO system with the localization of the instantiated automation module.

7. The method according to claim 1, further comprising modifying a non-instantiated automation module, whereby the modification affects all already instantiated automation modules.

8. The method according to claim 1, further comprising automatically interconnecting automation modules with specified rules provided.

9. The method according to claim 1, further comprising interconnecting instantiated automation modules by using a data list.

10. A non-transitory storage medium, which is readable by computer system of an automation system and with a computer program product having program code for the performance of the method according to claim 1.

* * * * *